(12) United States Patent
Miller et al.

(10) Patent No.: US 10,364,775 B2
(45) Date of Patent: Jul. 30, 2019

(54) WATER-INJECTION ANTI-FREEZING SYSTEM

(71) Applicant: Ford Global Technologies, LLC, Dearborn, MI (US)

(72) Inventors: Kenneth James Miller, Canton, MI (US); Thomas G. Leone, Ypsilanti, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 189 days.

(21) Appl. No.: 15/238,434

(22) Filed: Aug. 16, 2016

(65) Prior Publication Data

US 2018/0051658 A1   Feb. 22, 2018

(51) Int. Cl.
| | |
|---|---|
| *F02B 3/00* | (2006.01) |
| *F02M 25/022* | (2006.01) |
| *F01P 3/20* | (2006.01) |
| *F01P 7/16* | (2006.01) |
| *F02B 47/02* | (2006.01) |
| *F02M 25/03* | (2006.01) |
| *F01P 7/14* | (2006.01) |

(52) U.S. Cl.
CPC ........... *F02M 25/0227* (2013.01); *F01P 3/20* (2013.01); *F01P 7/16* (2013.01); *F02B 47/02* (2013.01); *F02M 25/0221* (2013.01); *F01P 2007/146* (2013.01); *F02M 25/03* (2013.01); *Y02T 10/121* (2013.01); *Y02T 10/16* (2013.01)

(58) Field of Classification Search
CPC ........ F02B 77/083; F02B 47/02; F02D 17/04; F02D 35/02; F02F 1/004; F02M 25/0227; F02M 25/03
See application file for complete search history.

(56) References Cited

U.S. PATENT DOCUMENTS

| | | | |
|---|---|---|---|
| 6,311,651 B1* | 11/2001 | Singh | F02B 47/02 123/25 C |
| 7,216,607 B2 | 5/2007 | Mezheritsky et al. | |
| 8,820,270 B2 | 9/2014 | Snow | |

(Continued)

FOREIGN PATENT DOCUMENTS

EP      0091752 A1    3/1983

OTHER PUBLICATIONS

Leone, Thomas G., et al., "Method and System for Controlling Water Injection," U.S. Appl. No. 15/216,497, Filed Jul. 21, 2016, 47 pages.

(Continued)

*Primary Examiner* — Hai H Huynh
*Assistant Examiner* — Gonzalo Laguarda
(74) *Attorney, Agent, or Firm* — Julia Voutyras; McCoy Russell LLP

(57) ABSTRACT

Methods and systems are provided for transferring heat from a coolant to a water injection system reservoir coupled to an engine of a vehicle. The water injection system reservoir may include a first reservoir fluidically coupled to a second reservoir, where the first reservoir is vertically higher than the second reservoir. The coolant may absorb waste heat from the engine, or from a hybrid electric vehicle power electronics system, and transfer heat to the water reservoir to prevent water from freezing even when ambient temperature is at or below the freezing temperature of water.

20 Claims, 5 Drawing Sheets

(56) References Cited

U.S. PATENT DOCUMENTS

| | | | | |
|---|---|---|---|---|
| 2003/0188700 A1* | 10/2003 | Mitsuhashi | ............ | F02B 37/001 123/25 C |
| 2006/0249102 A1* | 11/2006 | Morgan | ................. | F02B 47/02 123/25 J |
| 2010/0313831 A1* | 12/2010 | Szybist | ................... | F02B 47/02 123/64 |
| 2017/0167355 A1* | 6/2017 | Kim | ....................... | B60K 11/02 |
| 2018/0128140 A1* | 5/2018 | Park | .......................... | E02F 9/00 |

OTHER PUBLICATIONS

Miller, Kenneth James, et al., "Method and System for Engine Water Injection," U.S. Appl. No. 15/258,914, Filed Sep. 7, 2016, 47 pages.

* cited by examiner

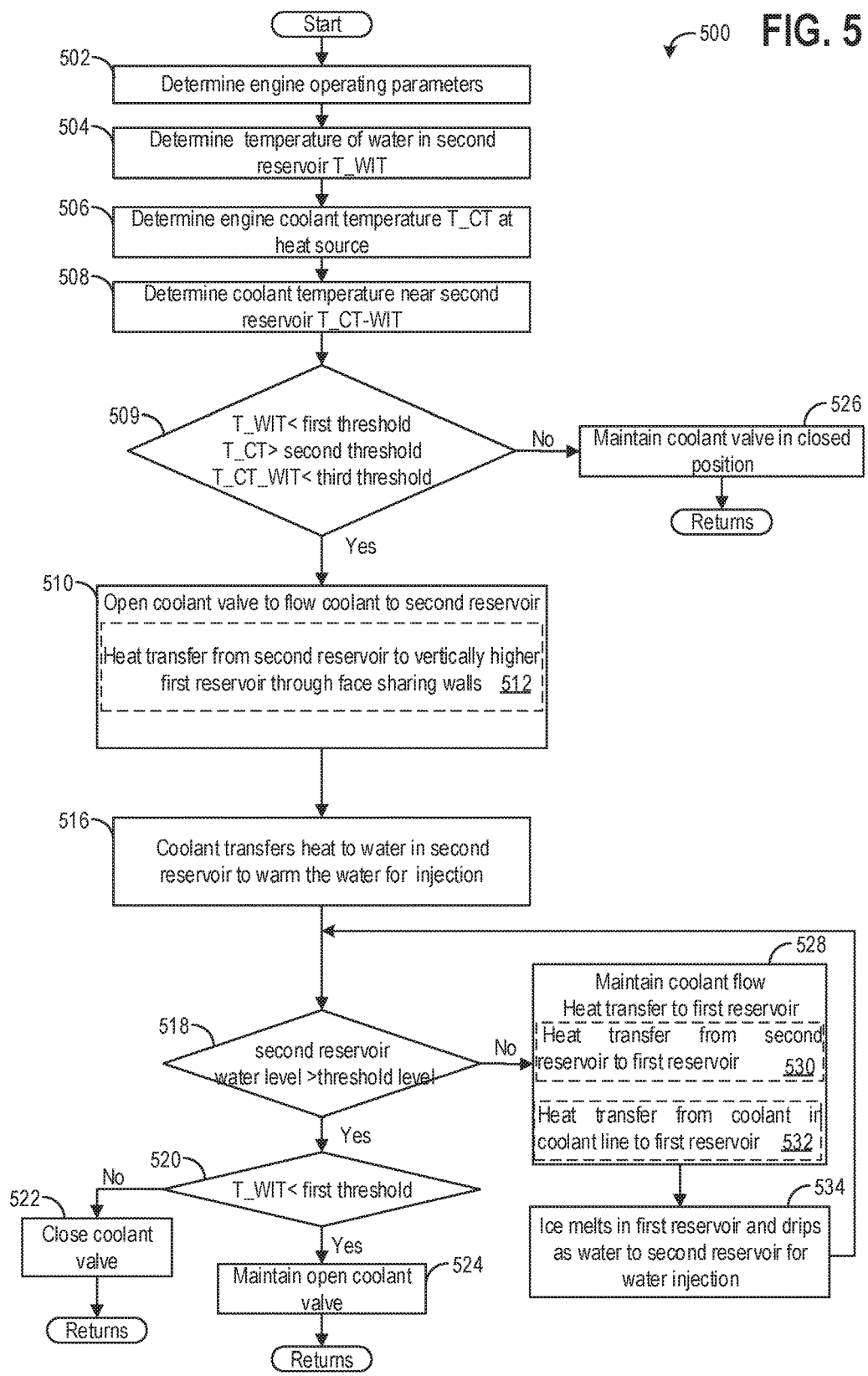

WATER-INJECTION ANTI-FREEZING SYSTEM

FIELD

The present description relates generally to methods and systems for warming a water-injection system reservoir of a vehicle engine.

BACKGROUND/SUMMARY

Injecting water into a mixture of fuel and air in an internal combustion engine reduces a working temperature in a combustion chamber of the internal combustion engine. Injecting water into the mixture of a fuel and air also reduces generation of undesirable fuel combustion byproducts such as NOx, carbon monoxide (CO), and various hydrocarbons, thereby improving emissions. A water reservoir may be coupled to the internal combustion engine for injecting water to the combustion chamber. The water from the water reservoir may evaporate rapidly if the water reservoir is in close proximity of the engine due to high temperature. Hence, the water reservoir may be positioned in an area of a vehicle where the temperature is closer to ambient temperature (for example, near a rear trunk, along a side body, or near a fuel tank of the vehicle). However, water in the water reservoir may freeze when ambient temperature is below freezing, interrupting water supply to a water injection system.

Other attempts to address the problem of water freezing in the water reservoir of the water injection system include storing and injecting a blend of water and ethanol from the water reservoir to prevent the water from freezing in the water reservoir. In another approach, the water in the water reservoir may be heated electrically through one or more heater elements coupled to the water reservoir.

However, the inventors herein have recognized potential issues with such systems. As one example, mixing water and ethanol increases cost and complicates the water injection system including complicated air/fuel ratio controls. Additionally, heating the water reservoir electrically increases fuel consumption.

In one example, the issues described above may be addressed by a water injection system, including a first reservoir fluidically coupled to a second reservoir, the second reservoir positioned at a vertically lower plane than the first reservoir, the second reservoir fluidically coupled to a water injector of an engine, a first coolant line in heat exchange relationship with the second reservoir, and a first coolant valve along the first coolant line, upstream of the second reservoir, configured to regulate flow of the coolant through the first coolant line.

In an example, heat exchange relationship between the coolant line and the water in the second reservoir may be by transferring/conducting heat from the coolant through walls of the coolant line to the water inside the second reservoir. The second reservoir may transfer heat to the first reservoir through face-sharing walls of each of the reservoirs. In one example, heat may be transferred to the first reservoir through coolant flowing through a second coolant line in heat exchange relationship with the first reservoir. Heat transfer to the first reservoir may melt ice formed in the first reservoir due to low ambient temperature. The water from the melted ice may drip down from the first reservoir to the fluidically connected second reservoir. Water from the second reservoir may be directed through the water injection line for injection into a combustion chamber of the engine.

In another example, the coolant warming the water in the second reservoir may absorb waste heat from a hybrid electric vehicle (HEV) power electronics system. A position of the coolant valve may be regulated based on a temperature of the second reservoir, and based on temperature of coolant at the engine or at the HEV power electronics system.

In this way, the above-described water injection system ensures supply of water for injection into the combustion chamber of the engine even when ambient temperature is below the freezing temperature of the water. In one example, the water injection system reservoir is heated via engine system coolant, and in another example, the water reservoir is heated via HEV power electronics coolant. By doing so, the water injection system may be heated during cold ambient conditions in an energy-efficient manner, ensuring supply of water for injection into the combustion chamber of the engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows a flowchart of an example method for transferring heat from a coolant to a water injection system reservoir.

DETAILED DESCRIPTION

Figure 1:
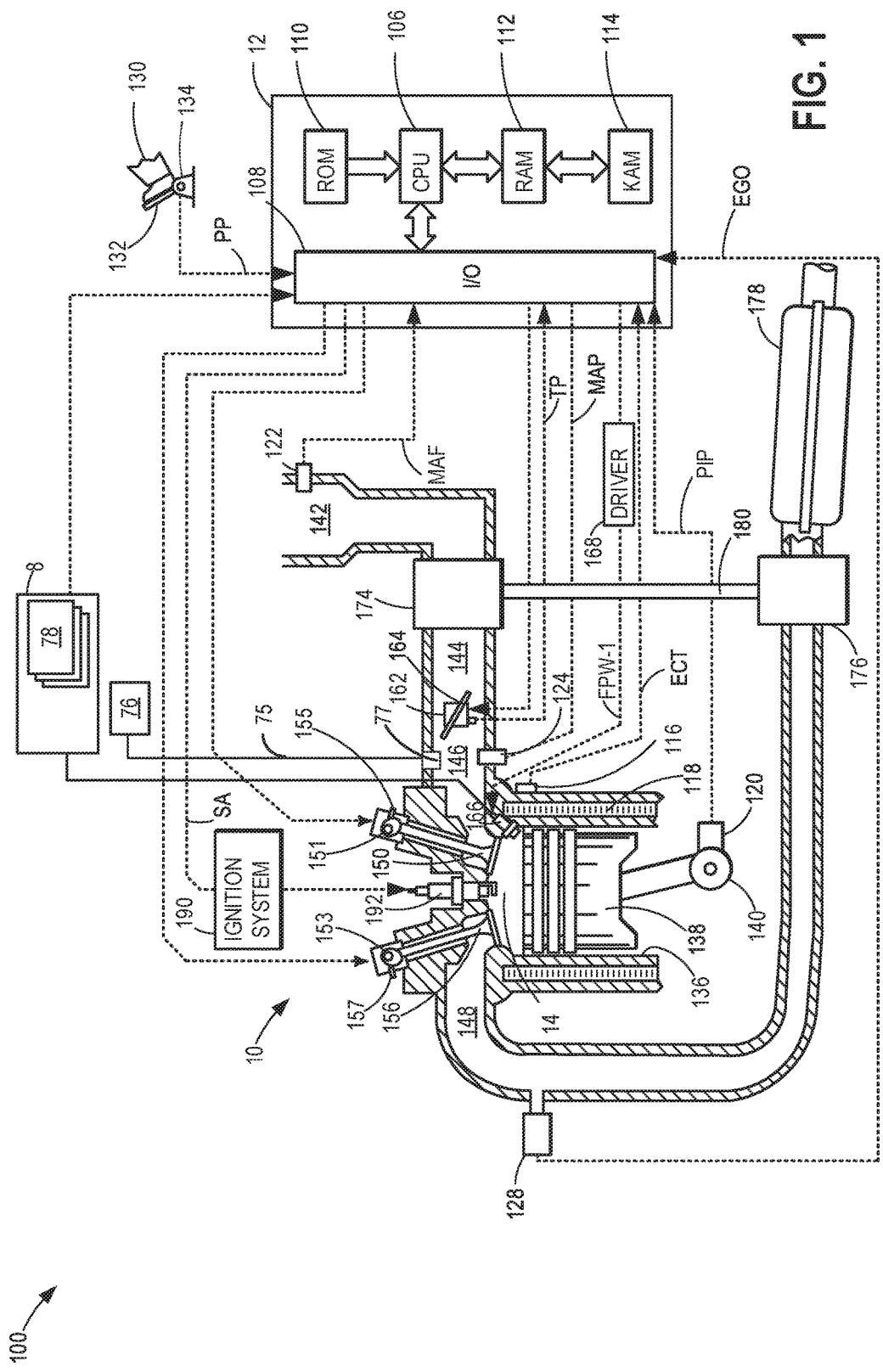
FIG. 1 shows a schematic diagram of an engine system of a vehicle.
Figure 2:
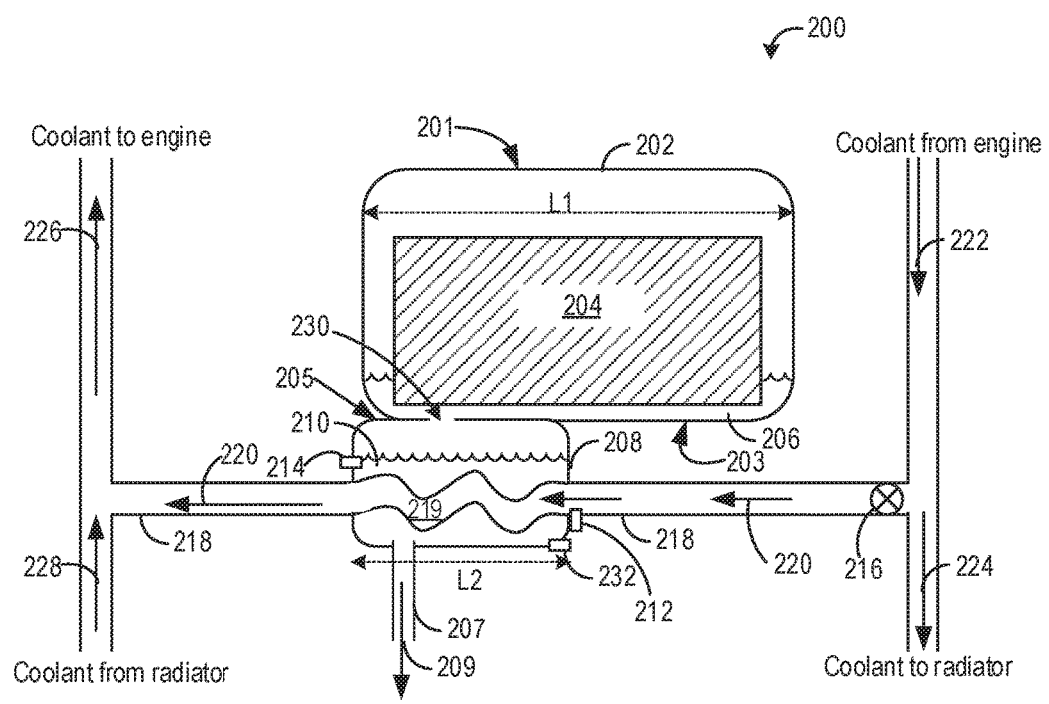
FIG. 2 shows a first embodiment of a water reservoir of a water injection system.
Figure 3:
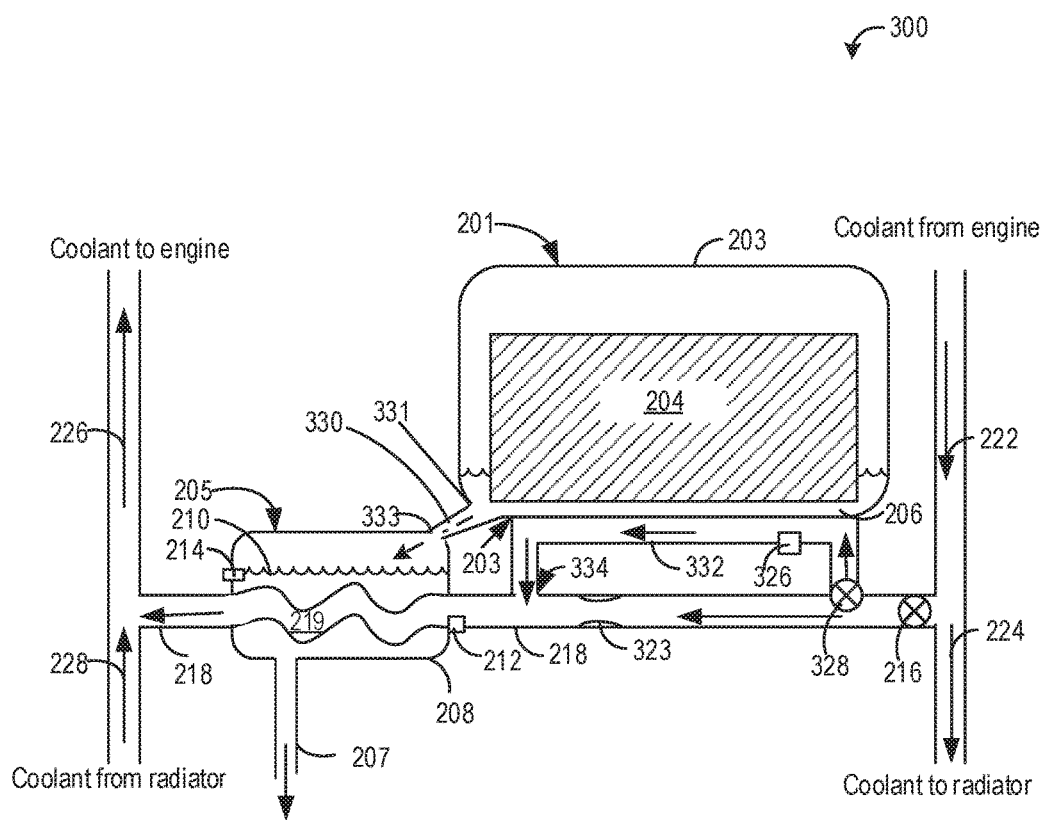
FIG. 3 shows a second embodiment of a water reservoir of a water injection system.
Figure 4:
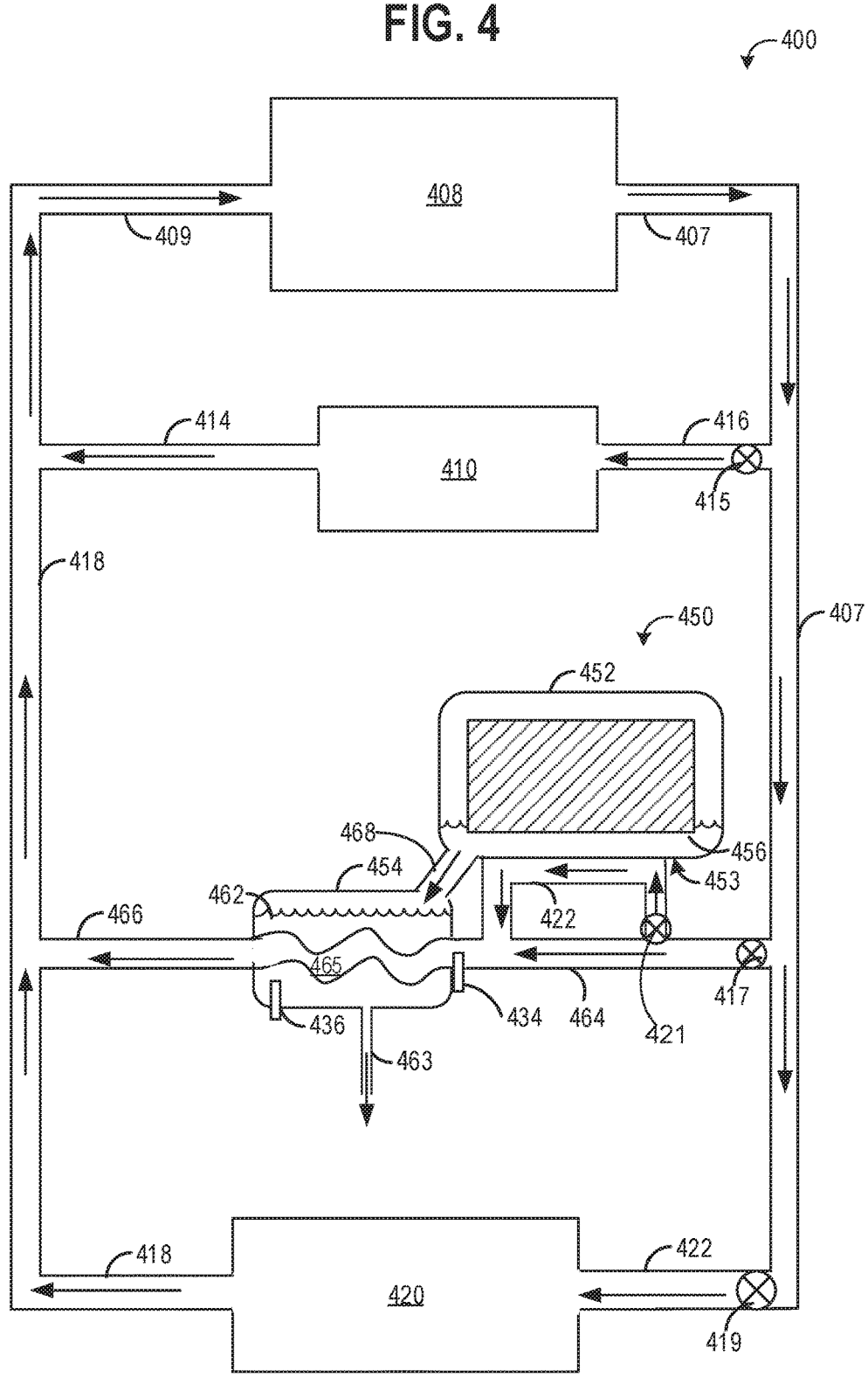
FIG. 4 illustrates a coolant system of a vehicle providing heat to a water injection system reservoir of the vehicle.

The following description relates to systems and methods for warming water in a reservoir of a water injection system configured to inject water into a combustion chamber of an engine. A vehicle engine, as shown in FIG. 1, may be a coupled to two or more reservoirs which may house a primary fuel and/or a secondary fluid (e.g., water) to be injected into the engine's cylinders. Water may be injected into a combustion chamber of the engine to decrease combustion temperature and to reduce undesired combustion byproducts such as NOx, CO, etc. in vehicle emissions. However, with a decrease in ambient temperature, the water stored in the reservoir may freeze, which may interrupt water supply from the reservoir to an injector coupled to a combustion chamber of the engine. Thus, according to embodiments disclosed herein, a water injection system may include a water reservoir that maintains the water supply from the water reservoir to the engine in liquid phase even at low ambient temperature. To achieve this, the water injection system may flow coolant from the engine or from a power electronics system (e.g., when the vehicle in which the engine is installed is a hybrid electric vehicle) to the water injection system reservoir to warm the water and to maintain water supply for injection to the combustion chamber of the engine. FIGS. 2 and 3 illustrate embodiments of water reservoirs of water injection systems with coolant flowing in heat exchange relationship with the water reservoirs. A coolant flow circuit for warming the water in a water injection system reservoir is illustrated in FIG. 4. A method for regulating coolant flow to the water injection system reservoir by regulating a position of a coolant valve based on a temperature of the coolant and a temperature of the water in the water reservoir is illustrated in a flowchart in FIG. 5.

In conditions when ambient temperature is low (at or below the freezing temperature of water, 32° F.), water in a water injection system reservoir may freeze, and ice formation in the reservoir may interrupt water supply to an injector coupled to the engine. Waste heat absorbed by a coolant from the engine (e.g., from the engine itself or from the engine exhaust) may be used to regulate the temperature of the water injection system reservoir to maintain a supply of water for injection into the engine. In one example, the coolant transferring heat to the water injection system reservoir may absorb waste heat from a HEV power electronics system.

An embodiment of a water reservoir system may include two fluidically coupled reservoirs. The relative positioning of the two reservoirs may be such that a first reservoir may be vertically higher than a second reservoir. The fluidic coupling of the first reservoir and the second reservoir may be configured to direct a liquid in the first reservoir to flow through a conduit to the vertically lower second reservoir due to gravity. Water from the second reservoir may be directed through one or more water injection lines for injection into combustion chambers of an engine to reduce combustion temperature. Heated coolant may flow through a coolant passage in heat exchange relationship with the second reservoir, warming the water inside the second reservoir. In an example where the second reservoir and the first reservoir are in physical face-sharing contact, heat from the second reservoir may be transferred to the first reservoir, which may melt at least some ice formed in the first reservoir. The melted ice/water from the first reservoir may flow to the vertically lower second reservoir, and water accumulated in the second reservoir may then be directed through the water injection line to the engine for injection.

In another example, each of the first reservoir and the second reservoir may receive heat from coolant flowing in coolant lines in heat exchange relationship with each of the reservoirs, increasing the temperature inside the reservoirs. At least some ice formed in the first reservoir may melt due to heat transfer from the coolant to the first reservoir. Water from the first reservoir may flow to the vertically lower second reservoir, which may then be used for injection into combustion chambers of the engine. The regulation of coolant flow for warming the water reservoir system may be based on input from a plurality of temperature sensors relayed to a controller. Based on the signals from the plurality of temperature sensors, the controller may then adjust a position of one or more valves to regulate coolant flow to transfer heat to the water reservoir system, as will be discussed below with reference to FIGS. 1-5.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 depicts an example vehicle system 101 including the engine 10. The engine 10 may receive a primary fuel and may additionally receive a secondary fluid. The secondary fluid may be water, which may be injected into the engine to reduce combustion temperature. In another example, the secondary fluid may be an alcohol-water mixture. The engine 10 may receive control parameters from a control system including controller 12 and input from a vehicle operator 130 via an input device 132. In this example, the input device 132 includes an accelerator pedal and a pedal position sensor 134 for generating a proportional pedal position signal PP. A cylinder (herein also referred to as a "combustion chamber') 14 of the engine 10 may include combustion chamber walls 136 with a piston 138 positioned therein. Piston 138 may be coupled to a crankshaft 140 so that reciprocating motion of the piston is translated into rotational motion of the crankshaft. The crankshaft 140 may be coupled to at least one drive wheel of the passenger vehicle via a transmission system. Further, a starter motor may be coupled to the crankshaft 140 via a flywheel to enable a starting operation of the engine 10.

The cylinder 14 can receive intake air via a series of intake air passages 142, 144, and 146. Intake air passage 146 may communicate with other cylinders of the engine 10 in addition to the cylinder 14. In some embodiments, one or more of the intake passages may include a boosting device such as a turbocharger or a supercharger. For example, FIG. 1 shows the engine 10 configured with a turbocharger including a compressor 174 arranged between intake passages 142 and 144, and an exhaust turbine 176 arranged along an exhaust passage 148. The compressor 174 may be at least partially powered by the exhaust turbine 176 via a shaft 180 where the boosting device is configured as the turbocharger. However, in other examples, such as where the engine 10 is provided with a supercharger, exhaust turbine 176 may be optionally omitted, where the compressor 174 may be powered by mechanical input from a motor or the engine. A throttle 162 including a throttle plate 164 may be provided along an intake passage of the engine for varying the flow rate and/or pressure of intake air provided to the engine cylinders. For example, the throttle 162 may be disposed downstream of the compressor 174 as shown in FIG. 1, or alternatively may be provided upstream of the compressor 174.

The exhaust passage 148 may receive exhaust gases from other cylinders of engine 10 in addition to the cylinder 14. A variable voltage (VVs) oxygen sensor 128 is shown coupled to exhaust passage 148 upstream of emission control device 178. The VVs oxygen sensor 128 may be used to estimate and/or measure the oxygen content of exhaust gas exhausted from the engine. The VVs oxygen sensor may also be used to estimate an amount of alcohol in the fuel burned in the engine and ambient humidity.

Exhaust temperature may be measured by one or more temperature sensors (not shown) located in the exhaust passage 148. Alternatively, exhaust temperature may be inferred based on engine operating conditions such as speed, load, air-fuel ratio (AFR), spark retard, etc. It may be appreciated that the exhaust gas temperature may alternatively be estimated by any combination of temperature estimation methods listed herein.

Each cylinder of the engine 10 may include one or more intake valves and one or more exhaust valves. For example, the cylinder 14 is shown including at least one intake poppet valve 150 and at least one exhaust poppet valve 156 located at an upper region of the cylinder 14. In some embodiments, each cylinder of the engine 10, including the cylinder 14, may include at least two intake poppet valves and at least two exhaust poppet valves located at an upper region of the cylinder.

The at least one intake poppet valve 150 may be controlled by the controller 12 by cam actuation via a cam actuation system 151. Similarly, the at least one exhaust poppet valve 156 may be controlled by the controller 12 via a cam actuation system 153. The cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of the at least one intake poppet valve 150 and the at least one exhaust poppet valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. A cam timing may be adjusted (by advancing or retarding the VCT system) to adjust an engine dilution in coordination with an EGR flow and/or a direct injection of a knock control fluid, thereby reducing EGR transients and improving engine performance.

The cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel, as may be the case with some diesel engines.

In some embodiments, each cylinder of engine 10 may be configured with one or more injectors. As a non-limiting example, the cylinder 14 is shown including a fuel injector 166. The fuel injector 166 is shown coupled directly to the cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows the fuel injector 166 as a side injector, it may also be located overhead of the piston, such as near the position of the spark plug 192. Such a position may improve mixing and combustion when operating the engine with an alcohol-based fuel due to the lower volatility of some alcohol-based fuels. Alternatively, the fuel injector may be located overhead and near the intake valve to improve mixing.

Primary fuel may be delivered to the fuel injector 166 from a high pressure fuel system 8 including one or more fuel tanks 78, fuel pumps, and a fuel rail. Alternatively, fuel may be delivered by a single stage fuel pump at lower pressure, in which case the timing of the direct fuel injection may be more limited during the compression stroke than if a high-pressure fuel system is used. Further, while not shown, fuel tanks 78 may have a pressure transducer providing a signal to controller 12. It will be appreciated that, in an alternate embodiment, the fuel injector 166 may be a port injector providing fuel into the intake port upstream of cylinder 14.

A secondary fluid may be stored in a reservoir 76. In one example, the reservoir 76 may be coupled to a water injector 77 through an insulated water injection line 75. In an example, the water injector 77 may be configured to inject water into an air stream flowing along the intake port between the compressor 174 and the combustion chamber, as illustrated in FIG. 1. In another example, the water injector 77 may be directly coupled to the combustion chamber of cylinder 14 to inject water directly into the combustion chamber. In another example, the reservoir 76 may be included in the fuel system 8, wherein water along with fuel may be injected through a direct injector of the cylinder, for example, the fuel injector 166. The reservoir 76 containing water may also be coupled to a windshield wiper system (not shown) to be used for windshield wiping purposes. It will also be appreciated that the reservoir 76 may include just water, or a blend of water and alcohol, or any other fluid, which may be injected through an injector coupled to the engine.

Fuel and secondary fluid may be delivered by the injector to the cylinder during a single cycle of the cylinder. Further, the distribution and/or relative amount of fuel or secondary fluid delivered from the injector may vary with operating conditions, such as aircharge temperature. Furthermore, for a single combustion event, multiple injections of the delivered fuel may be performed per cycle. The multiple injections may be performed during the compression stroke, intake stroke, or any appropriate combination thereof.

In some embodiments, the secondary fluid may be generated on board the vehicle from exhaust condensate, charge air cooler condensate, AC condensate drain, or rainwater drain. For example, the water in the reservoir 76 may be self-generated from water drained from the exhaust, charge air cooler, AC and/or rainwater drain, etc. By self-generating the secondary fluid, the number of consumables on the vehicle system may be reduced.

While not shown, it will be appreciated that the engine may further include one or more exhaust gas recirculation passages for diverting at least a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. The one or more EGR passages may include an LP-EGR passage coupled between the engine intake upstream of the turbocharger compressor and the engine exhaust downstream of the turbine, and configured to provide low pressure (LP) EGR. The one or more EGR passages may further include an HP-EGR passage coupled between the engine intake downstream of the compressor and the engine exhaust upstream of the turbine, and configured to provide high pressure (HP) EGR. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. The LP-EGR flow through the LP-EGR passage may be adjusted via an LP-EGR valve while the HP-EGR flow through the HP-EGR passage may be adjusted via an HP-EGR valve (not shown).

A coolant system (not shown) may circulate coolant through coolant lines along the engine 10 and through coolant lines along an exhaust gas recirculation cooler (not shown) to absorb waste heat. The heated coolant flowing along coolant lines may transfer heat to various components of the vehicle, for example, to the reservoir 76, to a radiator (not shown), to a passenger cabin (not shown), etc. After heat transfer from the coolant to the various components of the vehicle, the coolant may flow back to the engine 10 to absorb heat again. One or more pumps may be coupled to the coolant system to circulate the coolant.

In one embodiment, the coolant may flow in coolant passages in heat transfer relationship with a power electronics system of a HEV to absorb waste heat, thereby cooling the power electronics systems. The heated coolant may then flow to other components of the vehicle to transfer heat to warm the components. A coolant system of the vehicle for cooling various components, including a water reservoir system, will be described in details with reference to FIG. 4.

The controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. The controller 12 may receive various signals from sensors coupled to the engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system, and/or a knock sensor. In response to the signals received from the various sensors, the controller may operate various engine actuators. Example actuators include the fuel injector 166, the throttle 162, the cams 151 and 153, etc.

Storage medium the read-only memory 110 can be programmed with computer readable data representing instructions executable by the microprocessor 106 for performing the methods described below as well as other variants that are anticipated but not specifically listed. An example routine that may be performed is elaborated with reference to FIG. 5.

Referring now to FIG. 2, a first embodiment of a water reservoir system 200 is illustrated, which may supply water to an injector of a water injection system, similar to the reservoir 76 for supplying the secondary fluid to the cylinder 14 of the engine 10 illustrated in FIG. 1. The water reservoir system 200 includes a first reservoir 202 and a second reservoir 208, fluidically coupled to each other through a conduit 230. A coolant line 218 may enter the second reservoir 208, and coolant flowing through a heat exchange segment 219 of the coolant line 218 may be in heat exchange relationship with water 210 in the second reservoir 208. Heat transfer may happen between coolant in the heat exchange segment 219 and the water 210 in the second reservoir 208. At the end of the heat exchange segment 219, the coolant line 218 exits the second reservoir 208. In one example, the heat exchange segment 219 may not enter inside the second reservoir and may be present externally around a perimeter of the second reservoir. In another example, part of the heat exchange segment 219 may be inside, and a part of the heat exchange segment may be outside the second reservoir. The direction of coolant flow along the coolant line 218 and in the heat exchange segment 219 is indicated by arrows 220. The coolant line 218 may include a cylindrical tube or pipe having an outer wall that faces into the interior of the second reservoir along the heat exchange segment 219 and an inner wall defining an inner volume through which coolant passes. The heat exchange segment 219 may be one of a plurality of standard heat exchange units that are well known in the field that for example may include multiple passages, with external fins to distribute the heat. Coolant in the coolant line 218 is maintained separate from the water in the second reservoir 208 along the entirety of the heat exchange segment 219, and the coolant and the water do not mix at any point in the second reservoir.

The first reservoir 202 may be vertically higher than the second reservoir 208. In an example, the second reservoir 208 may be directly below the first reservoir 202, as illustrated in FIG. 2. In one example, a bottom wall 203, opposite a top wall 201 of the first reservoir 202, may be positioned above a top wall 205 of the second reservoir 208. The bottom wall 203 of the first reservoir may be at least in partial face sharing contact with the top wall 201 of the second reservoir. A first length L1 of the first reservoir 202 may be more than a second length L2 of the second reservoir 208, wherein part of the second length L2 or the entirety of the second length L2 of the top wall 205 of the second reservoir 208 may be in face sharing contact with at least part of the first length L1 of the bottom wall 203 of the first reservoir. The face sharing contact may allow heat to be transferred between the top wall of the second reservoir and the bottom wall 203 of the first reservoir 202.

In one example, a volume of the first reservoir 202 may be more than a volume of the second reservoir 208. In another example, a volume of each of the first reservoir and the second reservoir may be equal. In a further example, the volume of the second reservoir 208 may be more than the volume of the first reservoir 202.

The conduit 230 may extend from an opening at the bottom wall 203 of the first reservoir and a corresponding opening in the top wall 205 of the second reservoir, establishing fluidic connection between the first and the second reservoir. The opening in the bottom wall 203 of the first reservoir may be vertically higher than the opening in the top wall of the second reservoir. Fluid may drip from the first reservoir to the second reservoir along the fluid conduit 230 due to gravitational effect.

When ambient temperature is below the freezing temperature of water, water inside the first reservoir may freeze to form ice 204. Hence, water supply from the first reservoir to the second reservoir through the conduit 230 may be interrupted. The water 210 inside the second reservoir may not freeze when warm coolant flows in through the heat exchange segment 219 of the coolant line 218 and warms the water 210 inside the second reservoir even when ambient temperature is below the freezing temperature. The second reservoir may be an insulated reservoir. The warmed water from the second reservoir may flow through a water injection line 207 to an injector (not shown) for injecting water into a combustion chamber of the engine. The water injection line 207 may be insulated to maintain a temperature of the water flowing along the water injection line to the engine above freezing. In examples where the second reservoir is not insulated, water in the second reservoir may freeze as well during low temperature conditions. However, upon an engine start, the coolant flowing through the coolant line may rapidly melt the ice in the second reservoir owing to the reservoir's relatively small volume.

The heat from the warm water 210 in the second reservoir may be conducted through the face sharing contact between the top wall 205 of the second reservoir 208 and the bottom wall 203 of the first reservoir 202 to increase the temperature of the first reservoir. The increase in temperature in the first reservoir may melt the ice 204 to water 206, which may accumulate along the bottom wall 203 of the first reservoir.

The water 206 may drip through the conduit 230 and into the second reservoir 208, where the collected water may be warmed further based on coolant flow and coolant temperature along the heat exchange segment 219 of the coolant line 218. A temperature sensor 232 may sense a temperature of the water 210 in the second reservoir and a liquid level sensor 214 may sense level of the water 210 and relay the signal inputs to a controller, for example, the controller 12 of FIG. 1, which in turn may regulate coolant flow along the coolant line 218.

Coolant flow through the coolant line 218 may be regulated by a position of a coolant valve 216 along the coolant line 218. The coolant valve 216 may be coupled to the coolant line 218 upstream of the heat exchange segment 219 of the coolant line. The coolant valve 216 may an electrically actuated valve. In another example, the coolant valve 218 may be a thermally actuated valve (such as thermostat valve). The coolant valve may be a two-position valve (open and closed). In another example, the coolant valve 216 may be variable position valve, ranging from fully open to partially open to fully closed. In other embodiments, additional valves may be present along the coolant line.

A temperature sensor 212 may be coupled to the heat exchange segment 219 of the coolant line 218 downstream of the coolant valve 216. Additional temperature sensors may be coupled to the coolant line 218 to measure a temperature of the coolant in the coolant line 218. In one example, based on a temperature relayed from the temperature sensor 212 along the heat exchange segment 219 of the coolant line 218 to the controller, and based on additional temperature input signals from other temperature sensors to the controller, the controller may regulate the position of the coolant valve 216 to increase or decrease coolant flow through the coolant line 218. The regulation of coolant flow through the coolant line will be discussed further with reference to FIGS. 4 and 5 below.

Coolant flowing through the coolant line 218 may be an engine coolant, for example, coolant absorbing waste heat from the engine 10 in FIG. 1. In another example, the coolant flowing through coolant line 218 may absorb heat from the engine exhaust system. For example, the engine coolant may extract heat from hot exhaust flowing through an Exhaust Gas Heat Recovery (EGHR) system or from hot exhaust flowing through an EGR cooler (not shown). In another example, coolant may be the coolant flowing in coolant passages along a HEV power electronics system, wherein coolant may extract heat from the HEV power electronics systems resulting in lowering of the HEV power electronics temperature. Heated coolant may flow along a direction indicated by an arrow 222 from the engine or the HEV power electronics and may be directed to flow to the coolant line 218 or towards a radiator (not shown) along the direction indicated by an arrow 224. Coolant flows through the coolant line 218 along the direction 220 and exits the second reservoir after heat exchange with the water 210 in the second reservoir. Lower temperature coolant exiting the second reservoir may flow in a direction indicated by an arrow 220, and may flow to the engine along the direction indicated by arrow 226 along with the coolant from the radiator flowing along a direction indicated by an arrow 228. Coolant flow to and from the water reservoir system 200 will be discussed further with reference to FIG. 4

Referring now to FIG. 3, a second embodiment of a water reservoir system 300 is illustrated. Some parts previously introduced in FIG. 2 are numbered similarly and may not be reintroduced in FIG. 3.

In the water reservoir system 300, the first reservoir 202 and the second reservoir 208 may be in vertically different planes, similar to the first embodiment of the water reservoir 200 illustrated in FIG. 2. However, second reservoir may or may not be adjacent to the first reservoir, and not directly below the first reservoir. Hence, the bottom wall of the first reservoir and the top wall of the second reservoir may not be in face sharing contact. In one example, a conduit 330 may fluidically connect the first reservoir to the second reservoir. An inlet 331 of the conduit 330 may be coupled to the bottom wall 203 and an outlet 333 of the conduit 330 may be coupled to a top wall of the second reservoir 208. In other examples, the conduit 330 may be coupled to other walls of the first reservoir and/or the second reservoir, wherein the inlet 331 of the conduit 330 may be vertically higher than the outlet 333.

Because there is no face sharing contact between the bottom wall 203 of the first reservoir and the top wall 205 of the second reservoir 208, little or no heat may be transferred between the first reservoir and the second reservoir through the walls. Instead, the ice 204 in the first reservoir may be melted by transferring heat from a coolant to the first reservoir. In addition to the heat exchange segment 219 of the coolant line 218 in the second reservoir, a coolant line 332 may be in heat exchange relationship with the first reservoir. The coolant line 332 may branch off from the coolant line 218, downstream of the coolant valve 216 and upstream of the second reservoir, as illustrated in FIG. 3.

A coolant valve 328 may be coupled to the coolant line 332, wherein the coolant valve 328 may regulate coolant flow through the coolant line 332. In another embodiment, the coolant valve 328 and the coolant valve 216 may be replaced by a single coolant valve with multiple positions to direct coolant flow or to stop coolant flow through the coolant line 332. The single coolant valve may also regulate coolant flow through the coolant line 218. In one example, a restriction 323 may be present in the coolant line 218, upstream of the second reservoir 208, to ensure a backpressure to flow coolant through the coolant line 332 when coolant line 218 is also open for coolant flow.

A temperature sensor 326 may be coupled along the coolant line 332. Coolant may flow through the coolant valve 328 along the coolant line 332 in the direction indicated by arrows. The coolant line 332 may be in physical contact along with external surface/s of the first reservoir and heat may be exchanged between the coolant in the coolant line 332 and the first reservoir. In another example, the coolant line 332 may enter and exit the first reservoir and may be configured to be in heat exchange relationship with the contents inside the first reservoir. The coolant line 332, after heat exchange with the first reservoir, may join back with the coolant line 218 at a junction 334, prior to the second reservoir, as illustrated in FIG. 3. Thus, coolant flowing through the coolant line 332 may be reintroduced back into the coolant line 218 to flow to the heat exchange segment 219.

As heat exchange between the coolant in the coolant line 332 and the first reservoir occurs, the ice 204 may melt and the water 206 may flow through the conduit 330 to the second reservoir to combine with the water 210. Coolant flow to and from the coolant line 218 in water reservoir system 300 may be similar to the coolant flow described above with reference to FIG. 2, and will be discussed further with reference to FIG. 4.

In this way, according to the first embodiment illustrated in FIG. 2, ice formed in the first reservoir 202 due to low ambient temperature may be melted by transferring heat from warm coolant to the second reservoir and then heat from the second reservoir may be transferred to the first reservoir in the water reservoir system 200 illustrated in FIG. 2. In another embodiment, the first reservoir may receive heat directly form coolant flowing in a coolant line in heat exchange relationship with the first reservoir, as illustrated in FIG. 3. The water formed in the first reservoir due to melting of ice after heat transfer may flow through the conduit to the second reservoir due to gravity. The water in the second reservoir may be further warmed by coolant flowing in the heat exchange segment of the coolant line.

Thus, adequate water may be available in the second reservoir for supplying through the water injection line to the injector coupled to the engine cylinder, even when ice is formed in the first reservoir due to low ambient temperature. In one example, a check valve (not shown) may be present between the second reservoir and the water injection line, which may be in a closed position if no water is available inside the second reservoir. Additionally, one or more temperature sensors may be coupled to the water injection line.

In one example, when water has been in the water injection line for an extended period of time where the water in the water injection line is close to freezing temperature of water (for example, 3° F. more than the freezing temperature of 32° F.), the water in the water injection line may be drained back to the second reservoir, to prevent the water injection line from getting blocked due to ice formation. Once the temperature in the second reservoir is significantly above freezing and/or if the engine controller estimates a potential need for injected water in the next minute, so that the water will not be in the injector lines for an extended period of time, (for example, engine is not shut down, and is not still warming up), the flow of water from the second reservoir to the water injection line may be resumed. The position of one or more valves (not shown) along the water injection line may be regulated to drain the water from the water injection line back to the second reservoir.

Referring to FIG. 4 now, a coolant system 400 is illustrated. The coolant system 400 may be coupled to a water reservoir system 450 of a water injection system. In FIG. 4, the water reservoir 450 is similar to the water reservoir system 300 of FIG. 3. In other embodiments, the water reservoir 450 may be similar to the water reservoir system 200 illustrated in FIG. 2. Coolant flow along coolant lines and the points of entry and exit for the coolant lines are illustrated schematically and the actual mechanical configuration of the coolant lines and the actual points of entry and exit of the coolant lines are not shown.

An engine 408, similar to the engine 10 of FIG. 1, may include coolant passages (not shown) in contact with various components of the engine 408, through which coolant may flow. A coolant line 409 may direct coolant to flow in the coolant passages in the engine 408. The coolant entering the engine 408 may be at a lower temperature than a temperature of the engine 408. Heat from the various engine components may transfer to the coolant flowing through the coolant passages, thus cooling the engine. Coolant may also absorb waste heat from the engine exhaust, for example, by flowing in coolant passages through an EGR cooler (not shown) or other suitable exhaust heat exchanger. Heated coolant may flow out of the engine through a coolant line 407, wherein a temperature of the coolant exiting the engine 408 may be more than the temperature of the coolant entering the engine through the coolant line 409.

Warm coolant flowing through the coolant line 407 may be directed to warm one or more vehicle components 410. The one or more vehicle components 410 may include a passenger cabin heater core, one or more thermal storage devices, etc. Coolant may flow to the one or more vehicle components 410 through a coolant line 416, branching off from the coolant line 407. A valve 415 may regulate flow through the coolant line 416 to the one or more vehicle components 410. A position of the valve 415 may be regulated by a controller, for example, the controller 12 of FIG. 1, based on signal from temperature sensors coupled to the one or more vehicle components. The coolant line 416 and the valve 415 are only a schematic representation of coolant flow towards the one or more vehicle components. However, multiple coolant lines may branch off from the coolant line 407 and one or more coolant valves may regulate coolant flow along each of the coolant lines flowing coolant to the one or more vehicle components. In some examples, a system restriction such as an orifice may be used to control the distribution of coolant flow through various lines of the coolant system. This may replace any one or more valves mentioned above, or the restriction may be in addition to the valve/s.

Meanwhile, coolant flowing along the coolant line 407 may also flow towards the water reservoir 450. A coolant line 464 may originate from the coolant line 407, and flow coolant towards the water reservoir 450.

The water reservoir system 450 may include a first reservoir 452 in fluidic communication through a conduit 468 with a second reservoir 454, similar to the water reservoir system 300 illustrated in FIG. 3. The coolant in the coolant line 464 may flow through the second reservoir, wherein coolant in a heat exchange segment 465 may transfer heat to water 462 inside the second reservoir 454. A liquid level sensor 436 may be coupled to the second reservoir. A temperature sensor may also be coupled to the second reservoir. Coolant flow from the coolant line 407 to the coolant line 464 may be regulated by a valve 417. The valve 417 may be an electrically actuated valve. In another example, the coolant valve 417 may be a thermally actuated valve (such as a thermostat valve). The coolant valve may be a two-position valve (e.g., only adjustable to an open position and a closed position). In another example, the coolant valve 417 may be variable position valve, ranging from fully open to partially open to fully closed. In other embodiments, additional valves may be present along the coolant line. A temperature sensor 434 may be coupled to heat exchange segment 465 of the coolant line 464, downstream of the coolant valve 417.

Coolant may flow towards the first reservoir through a coolant line 422, wherein the coolant line 422 may branch off from the coolant line 464, as illustrated in FIG. 4. Coolant flow to the coolant line 432 from the coolant line 464 may be regulated by a valve 421. A temperature sensor may be coupled to the coolant line 432. In another example, coolant line to the first reservoir may not branch off from the coolant line 464, but may originate directly from the coolant line 407.

The coolant line 422 may be in heat exchange relationship with a bottom wall of the first reservoir 452, transferring heat from the coolant to melt ice formed in the first reservoir due to low ambient temperature. The melted ice collects as water 456 along the bottom wall 453 and may flow through the fluid conduit 468 to the second reservoir 454.

Coolant flowing through the coolant line 407 beyond the water reservoir 450 may flow to a radiator 420 through a coolant line 422. Coolant flow to the radiator 420 through the coolant line 422 may be regulated by a valve 419 along the coolant line 422.

Coolant flowing through the radiator 420 may be cooled in heat exchange relationship with ambient air, and after transferring heat to ambient air, the coolant flows out of the radiator through a coolant line 418 to flow towards the engine to cool the engine. The coolant flowing along the coolant line 418 towards the engine 408 may be at a lower temperature than the coolant flowing from the engine in the coolant line 407.

The coolant line 418 may also receive low temperature coolant from additional coolant lines. Coolant exiting the second reservoir of water reservoir 450 along a coolant line 466 may join the coolant line 418, flowing coolant towards the engine. Coolant flowing after transferring heat to the one or more components of the vehicle 410 may flow through a coolant line 414 joining the coolant line 418. Thus, coolant after transferring heat to various systems may flow to the engine 408 through the coolant line 418 and coolant line 409 to cool the engine and to recover heat from the engine exhaust.

In one example, the coolant may recover heat from HEV power electronics system instead of the engine 408. The heat recovered by the coolant flowing through coolant passages in close proximity of the HEV power electronic system may decrease a temperature of the HEV power electronics systems. The warmer coolant after absorbing heat from the power electronics may then be used for warming various components of the vehicle, as described above.

In one example, the water reservoir system 200 may be coupled to the coolant line 464, wherein coolant flow through the heat exchange segment of the coolant line may transfer heat to the water in the second reservoir. The first reservoir and the second reservoir may be in at least partial face sharing contact, as illustrated in FIG. 2, wherein heat from the second reservoir may be transferred to the first reservoir and ice in the first reservoir may melt. The water from the melted ice in the first reservoir may drip to the second reservoir through the conduit 230 as described previously with reference to FIG. 2. Coolant flow may be regulated through the second reservoir by regulating the position of the valve 417. In this embodiment, no coolant flow may be directed towards the first reservoir. Water from the second reservoir may flow through the water injection line 463 to be injected to the engine. A temperature sensor may be coupled to the water injection line.

Thus, the waste heat absorbed by the coolant from the engine or the HEV power electronics systems may be transferred to the water reservoir system to prevent ice formation when ambient temperature is low, thereby maintaining water supply to the water injection system coupled to the engine. Additionally, heat energy from the coolant may also be transferred to other components of the vehicle to increase temperature of the components. The coolant after transferring the heat energy to various components is at a lower temperature than coolant before transferring heat energy. The low temperature coolant may then be directed back to the engine to absorb waste heat. In this way, coolant in the coolant system of the vehicle may be used in an energy-efficient manner for both cooling (the engine, the HEV power electronics) and heating (the water reservoir, other vehicle components) functions.

A method 500 for regulating coolant flow to a water reservoir system is illustrated in a flowchart in FIG. 5. The coolant may transfer heat to the water reservoir system when the ambient temperature is below the freezing temperature of water to prevent the water in the water reservoir from freezing, thereby maintaining liquid water supply in the water reservoir system for injection to an engine. In one example, the method 500 may regulate coolant flow to the water reservoir system 200 (illustrated in FIG. 2) or to the water reservoir system 300 (illustrated in FIG. 3) along the coolant circuit 400 illustrated in FIG. 4. The water reservoir may include the first reservoir 202, which is vertically higher than the second reservoir 208 and fluidically connected to the second reservoir 208. Coolant flow along the coolant line 218 through the second reservoir may be regulated by the coolant valve 216 along the coolant line to warm the water in the second reservoir. Heat may be transferred to the first reservoir from the second reservoir due to face sharing contact between the first and the second reservoir, as illustrated in FIG. 2. In another embodiment, the first reservoir may receive heat from the coolant flowing through the coolant line that is in heat exchange relationship with the first reservoir, as illustrated in FIGS. 3 and 4.

Instructions for carrying out method 500 and the rest of the methods included herein may be executed by a controller, for example, the controller 12 of FIG. 1, based on instructions stored on a memory of the controller and in conjunction with signals received from sensors of the engine system, such as the temperature sensors 212 and 232, and the liquid level sensor 214) described above with reference to FIGS. 2 and 3. The controller may employ engine actuators of the engine system to adjust position of one or more valves, such as the coolant valve 216 of FIGS. 2 and 3, regulating coolant flow to warm the water in water reservoir system, according to the methods described below.

The method 500 begins at 502 by determining engine operating conditions based on feedback from a plurality of engine sensors. Engine operating conditions may include but are not limited to, engine speed and load, engine temperature, exhaust temperature, coolant temperature at the engine, water temperature in the second water reservoir of the water injection system, liquid level in the water reservoir of the water injection system, engine knock, an oxygen concentration of the exhaust gas, etc.

At 504, method 500 determines a temperature of water inside the second reservoir (T_WIT) of the water reservoir system. The second reservoir may be the second reservoir 208 (illustrated in FIGS. 2 and 3). A temperature sensor coupled to the second reservoir may relay the water temperature T_WIT to the controller, for example, the temperature sensor 232 of FIGS. 2 and 3 may provide the controller 12 (FIG. 1) with T_WIT.

At 506, the method 500 determines coolant temperature T_CT at the source of heat absorption by the coolant. In one example, the source of heat absorption for the coolant may be the engine, where the coolant may be absorbing heat, including from hot engine exhaust, to cool the engine and the exhaust. In another example, the source of heat absorption for the coolant may be the HEV power electronics system, where the coolant absorbs heat from the power electronics to cool the power electronics system. One or more temperature sensors, such as the temperature sensor 116 of FIG. 1, may be coupled to the coolant system at the source of heat absorption and may provide T_CT as an input signal to the controller.

At 508, the method 500 determines temperature of coolant near the second reservoir, for example in the heat exchange segment of the second reservoir, T_CT-WIT. In one example, the temperature sensor 212 coupled to the heat exchange segment 219 of the coolant line 218 of FIGS. 2 and 3 may relay T_CT-WIT to the controller.

At 509, method 500 assesses if the T_WIT is less than a first threshold temperature. The first threshold temperature may be a few degrees (for example, 6° F.) more than the freezing temperature of water (32° F.) of water. In one example, the first threshold may be 38° F. At 509, the method 500 also determines if T_CT is more than a second threshold temperature, wherein the second threshold temperature is higher than the first threshold temperature. In one example, the second threshold may 50° F. higher than the first threshold. At 509, the method 500 also determines if T_CT-WIT is less than a third threshold, wherein the third threshold is more than the first threshold and is more than the second threshold. In one example, T_CT-WIT may be close to boiling temperature of water (for example, 212° F.).

At 509, if T_WIT is not less than first threshold, T_CT is not more than the second threshold, and/or T_CT-WIT is above the third threshold, the method proceeds to 526, where the coolant valve is maintained in the closed position, such that no coolant flows towards the water reservoir. When the T_WIT is above the first threshold temperature (for example, 100° F.), the water in the second reservoir is not close to freezing temperature. Hence, no coolant flow for warming the water is required. If T_CT is not more than the second threshold at 509, the coolant does not have adequate heat energy to warm the water in the second reservoir if water warming is desired.

Additionally, if T_CT-WIT is not less than the third threshold, the water in the second reservoir may start to boil due to excess temperature of the coolant in the heat exchange segment that may be transferred to the water. Hence, at 526, the closed coolant valve position is maintained. The method 500 then returns.

In one example, if the water in the second reservoir is at 38° F., and the temperature of engine coolant flowing through the heat exchange segment of the coolant line (T_CT-WIT) passing through the second reservoir is near boiling temperature of 212° F., there may be localized boiling/evaporation of the water at the surface of the heat exchange segment for a short duration (for example, more than one minute) before the heat dissipates throughout the water mass in the second reservoir to raise the reservoir temperature to above 42° F. At least in some examples, such localized boiling may be undesirable, as it may lead to heat exchanger degradation or other issues.

If coolant in the heat exchange segment of the water reservoir is too hot, the flow of coolant through the coolant line leading to heat exchange segment in the second reservoir may be stopped by positioning the coolant valve in a closed position. While the coolant valve is in the closed position, hot coolant in the heat exchange segment transfers some of the heat to the water in the water reservoir, and cools down. In one example, based on the measured temperature T_CT-WIT, the coolant valve may be operated in a duty cycle where the coolant valve may be in an open position for 10% of the time and may be in the closed position 90% of the time, to control the rate at which heat is transferred from the heat exchange segment of the coolant line to the water in the second reservoir.

However, at 509, if T_WIT is less than first threshold, T_CT is more than the second threshold, and T_CT-WIT is less the third threshold, the method proceeds to 510, where the coolant valve is opened to direct coolant flow through the coolant line in heat exchange relationship with the second reservoir. The coolant flowing through the coolant line transfers heat to warm the water in the second reservoir. As the T_WIT is less than first threshold, warming of the water reservoir will prevent ice formation as ice may interrupt water supply to the water injector coupled to the engine. When the T-CT is above the second threshold, it indicates that adequate heat is present in the coolant, which may be transferred through the coolant line to warm the water in the second reservoir. However, as T_CT-WIT is not above the third threshold, the coolant in the heat exchange segment of coolant line does not have more than desired heat to transfer to the water in the second reservoir, and thus, the water in the second reservoir will not boil and evaporate in a localized manner due to excess heat transfer from the heat exchange segment of the coolant line. In one example, as indicated at 512, opening the coolant valve to enable heat transfer to the first reservoir may happen through the second reservoir, wherein the first reservoir is vertically above the second reservoir and is at least in partial face sharing contact with a wall of the second reservoir (such as the water reservoir system 200 illustrated in FIG. 2). As coolant flow through the coolant line increases T_WIT in the second reservoir, heat from the second reservoir may be conducted through the face sharing walls to the first reservoir, increasing the temperature inside the first reservoir.

At 516, the coolant flowing through the heat exchange segment of the coolant line warms the water inside the second reservoir. The water in the second reservoir is now available for injection through the water injection line to the engine. The temperature of the coolant in the heat exchange segment of the coolant line (T_CT-WIT) may be monitored and the coolant valve may be closed if the T_CT-WIT increases to more than the third threshold.

At 518, method 500 determines if the second reservoir water level is more than a threshold level. The threshold level may indicate a minimum volume of water in the second reservoir to enable delivery through the water injection line to the injector coupled to the engine for water injection. The water level may be assessed by a liquid level sensor coupled to the second reservoir (for example, the liquid level sensor 214 coupled to the second reservoir 208 in FIGS. 2 and 3) and the water level signal may be relayed to the controller.

If the water level is not more than the threshold level at 518, adequate water is not available in the second reservoir to be directed to the water injector coupled to the engine. The method 500 proceeds to 528, where coolant flow to the second reservoir is continued through the open coolant valve to transfer heat from the coolant to the second reservoir and heat is transferred to the first reservoir. In one example, as indicated at 530, heat transfer to the first reservoir may happen through the second reservoir, wherein the first reservoir is vertically above the second reservoir and is at least in partial face sharing contact with a wall of the second reservoir (such as the water reservoir system 200 illustrated in FIG. 2). In another example, as indicated at 532, heat transfer to the first reservoir may occur by opening a second coolant valve to flow warm coolant through a second coolant line in heat exchange relationship with the first reservoir. The coolant in the second coolant line may transfer heat to the first reservoir (such as in the water reservoir system 300 illustrated in FIG. 3).

As the coolant continues transferring heat to the water reservoirs, the method 500 proceeds to 534, where the melted ice drips as water from the first reservoir to the second reservoir, increasing the water level in the second reservoir for water injection. The method 500 then returns to 518 to assess if the water level in the second reservoir is above the threshold level.

The method 500 proceeds to 520 if the water level in the second reservoir is above the threshold level at 518, to determine if T_WIT is less than the first threshold temperature. If yes, the method 500 proceeds to 524, where the coolant valve is maintained in the open position to flow coolant to the first reservoir to continue warming the water in the first reservoir. The method 500 then returns.

However, if at 520, T_WIT is not less than first threshold, it indicates that the water in the second reservoir is adequately warmed. The method 500 proceeds to 522, where the coolant valve is closed to stop coolant flow through the second reservoir, as the water does not need to be warmed any further. In one example, the coolant valve may be closed when T_WIT is a few degrees above the first threshold (e.g., the first threshold may be 38° F. and the coolant valve may be closed when T_WIT is 42° F.). The warmed water may be directed through the water injection line from the first reservoir to the injector coupled to the engine for water injection. The method 500 then returns.

In this way, the coolant recovering waste heat from the engine or the HEV power electronics system may transfer the heat to the water reservoir system to maintain a supply of water in the second reservoir for water injection in to the engine even when ambient temperature is at or less than the freezing temperature of water. The water in the second reservoir is warmed by the coolant flowing through the coolant line transferring heat to the water. The first reservoir, which may be vertically higher than the second reservoir and fluidically coupled to the second reservoir, may be warmed by heat transfer from the second reservoir due to physical contact between the first and the second reservoir. Alternatively, the first reservoir may be warmed by coolant flowing through a second coolant line in heat exchange relationship with the first reservoir. Heat transfer to the first reservoir may melt ice in the first reservoir, and the melted ice (water) drips down to the second reservoir due to gravitational force. Thus, even when ambient temperature is low, a supply of water may be available in the second reservoir through the water injection line for injecting into the engine.

The technical effect of transferring heat from a coolant to a water reservoir of a water injection system includes maintaining a supply of water in the water reservoir even at low ambient temperature. The use of waste heat recovered by the coolant either from of an engine or from HEV power electronics systems, and transferring it to the water reservoir provides an energy-efficient system for using the coolant for both cooling and heating functions in the vehicle. Maintaining a supply of water in the water reservoir for water injection even when ambient temperature is low, allows water to be injected to reduce combustion temperature inside the cylinders of the engine, improving fuel economy. Additionally, water injection reduces formation of combustion by products such as NOx, CO etc., thereby improving vehicle emissions.

An example water injection system includes a first reservoir fluidically coupled to a second reservoir, the second reservoir positioned at a vertically lower plane than the first reservoir, the second reservoir fluidically coupled to a water injector of an engine, a first coolant line in heat exchange relationship with the second reservoir, and a first coolant valve along the first coolant line, upstream of the second reservoir, configured to regulate flow of the coolant through the first coolant line. Heat exchange relationship may include transfer of heat from the coolant in the first coolant line through a wall of the first coolant line to the second reservoir without mixing of the coolant with the contents of the second reservoir. A first example of the water injection system includes wherein a first volume of the first reservoir is greater than a second volume of the second reservoir. A second example of the water injection system includes the first example and further includes wherein a bottom wall of the first reservoir and a top wall of the second reservoir are at least in partial face sharing contact with each other. A third example of the water injection system optionally includes one or more of the first and second examples, and further includes wherein an inlet of a fluid conduit fluidically coupling the first reservoir to the second reservoir is in the bottom wall of the first reservoir and an outlet of the fluid conduit is in the top wall of the second reservoir. A fourth example of the water injection system optionally includes one or more of the first through the third examples, and further includes wherein further comprising a second coolant line including a second coolant valve, the second coolant line in heat exchange relationship with the first reservoir. A fifth example of the water injection system optionally includes one or more of the first through the fourth examples, and further includes wherein the second coolant line originates at a branching point along the first coolant line downstream of the first coolant valve, and after heat exchange with the first reservoir, the second coolant line fluidically connects to the first coolant line upstream of the second reservoir and downstream of the branching point. A sixth example of the water injection system optionally includes one or more of the first through the fifth examples, and further includes wherein the first coolant line passes through an inner volume of the second reservoir. A seventh example of the water injection system optionally includes one or more of the first through the sixth examples, and further includes wherein the first coolant line is along a bottom surface of the second reservoir. An eighth example of the water injection system optionally includes one or more of the first through the seventh examples, and further includes wherein the coolant is an engine coolant. A ninth example of the water injection system optionally includes one or more of the first through the eighth examples, and further includes wherein the coolant is hybrid electric vehicle power electronics coolant. A tenth example of the water injection system optionally includes one or more of the first through the ninth examples, and further includes wherein a controller with computer readable instructions stored on non-transitory memory to open the first coolant valve responsive to a temperature in the second reservoir being below a first threshold. An eleventh example of the water injection system optionally includes one or more of the first through the tenth examples, and further includes wherein the controller includes further instructions to open the first coolant valve responsive to a temperature of coolant at a heat recovery source for heating the coolant being more than a second threshold.

An example method, including opening a first coolant valve responsive to a temperature of a first reservoir being less than a first threshold and a temperature of coolant at a heat recovery source being more than a second threshold, and flowing coolant through the first coolant line in heat exchange relationship with the first reservoir, the first reservoir fluidically coupled to a second reservoir and to a water injector of an engine, and closing the first coolant valve responsive to the temperature of the first reservoir being more than the first threshold, thus stopping coolant flow through the first coolant line. A first example of the method includes wherein the first threshold is lower than second threshold. A second example of the method the first example and optionally includes wherein the heat recovery source is an engine. A second example of the method optionally includes one or more of the first and second examples, and further includes wherein the heat recovery source is a hybrid electric vehicle power electronics system. A third example of the method optionally includes one or more of the first and second examples, and further includes adjusting a position of a second coolant valve along a second coolant line in heat exchange relationship with the second reservoir. A fourth example of the water injection system optionally includes one or more of the first and second examples, and further includes adjusting the position of the second coolant valve comprises, responsive to a water level in the first reservoir being less than a threshold water level, opening the second coolant valve to direct coolant flow to the second coolant line through the second coolant valve.

Another example system includes a first reservoir fluidically coupled to a second reservoir, the second reservoir fluidically coupled to a water injection line coupled to an engine, a first coolant line in heat exchange relationship with the first reservoir, a second coolant line in heat exchange relationship with the second reservoir, a first coolant valve along the first coolant line configured to regulate flow of coolant through the first coolant line, and a second coolant valve along the second coolant line configured to regulate flow of coolant through the second coolant line. A first example of the system includes wherein the second reservoir is vertically lower than the first reservoir with no face sharing contact with the first reservoir.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A water injection system, comprising:
a first reservoir holding a fluid with water, the first reservoir only directly fluidically coupled to a second reservoir, the second reservoir positioned at a vertically lower plane than the first reservoir, the second reservoir fluidically coupled to a fluid injector of an engine;
a first coolant line in heat exchange relationship with the second reservoir; and
a first coolant valve along the first coolant line, configured to regulate flow of coolant through the first coolant line, the first coolant valve opened responsive to a temperature of the first reservoir being less than a first threshold and a temperature of coolant at a heat recovery source being more than a second threshold, and
the first coolant valve closed responsive to the temperature of the first reservoir being more than the first threshold, thus stopping coolant flow through the first coolant line.
2. The water injection system of claim 1, wherein a first volume of the first reservoir is greater than a second volume of the second reservoir.

3. The water injection system of claim 1, wherein a first wall of the first reservoir and a second wall of the second reservoir are at least in partial face sharing contact with each other.

4. The water injection system of claim 3, wherein an inlet of a fluid conduit fluidically coupling the first reservoir to the second reservoir is in the first wall of the first reservoir and an outlet of the fluid conduit is in the second wall of the second reservoir.

5. The water injection system of claim 1, further comprising a second coolant line including a second coolant valve, the second coolant line in heat exchange relationship with the first reservoir.

6. The water injection system of claim 5, wherein the second coolant line originates at a branching point along the first coolant line, and after heat exchange with the first reservoir, the second coolant line fluidically connects to the first coolant line upstream of the second reservoir and downstream of the branching point.

7. The water injection system of claim 1, wherein the first coolant line passes through an inner volume of the second reservoir.

8. The water injection system of claim 1, wherein the first coolant line is along a bottom surface of the second reservoir.

9. The water injection system of claim 1, wherein the first coolant line fluidically connects to an engine coolant system.

10. The water injection system of claim 1, wherein the first coolant line fluidically connects to a hybrid electric vehicle power electronics coolant system.

11. The water injection system of claim 1, further comprising a controller with computer readable instructions stored on non-transitory memory to open the first coolant valve responsive to a temperature in the second reservoir being below the first threshold.

12. The water injection system of claim 11, wherein the controller includes further instructions to open the first coolant valve responsive to a temperature of coolant at the heat recovery source for heating the coolant being more than a second threshold.

13. A method, comprising:
opening a first coolant valve responsive to a temperature of a first reservoir holding a fluid with water being less than a first threshold and a temperature of coolant at a heat recovery source being more than a second threshold, and flowing coolant through a first coolant line in heat exchange relationship with the first reservoir, the first reservoir only directly fluidically coupled to a second reservoir, wherein the second reservoir is positioned vertically below the first reservoir, and wherein the second reservoir is fluidically coupled to a fluid injector of an engine; and
closing the first coolant valve responsive to the temperature of the first reservoir being more than the first threshold, thus stopping coolant flow through the first coolant line.

14. The method of claim 13, wherein the first threshold is lower than the second threshold.

15. The method of claim 13, wherein the first reservoir is upstream of the second reservoir, and wherein the second reservoir is upstream of the fluid injector of the engine.

16. The method of claim 13, further comprising adjusting a position of a second coolant valve along a second coolant line in heat exchange relationship with the second reservoir.

17. The method of claim 16, wherein adjusting the position of the second coolant valve comprises, responsive to a water level in the first reservoir being less than a threshold water level, opening the second coolant valve to direct coolant flow to the second coolant line through the second coolant valve.

18. A method, comprising:
opening a first coolant valve of a first reservoir holding a fluid with water;
flowing coolant through a first coolant line in heat exchange relationship with the first reservoir, the first reservoir only directly fluidically coupled to a second reservoir, the second reservoir positioned vertically below the first fluid reservoir, and the second reservoir fluidically coupled to a fluid injector of an engine; and then
closing the first coolant valve, thus stopping coolant flow through the first coolant line.

19. The method of claim 18, wherein the first reservoir and the second reservoir are pumpless.

20. The method of claim 16, wherein the position of the second coolant valve is adjusted via a controller, and wherein the first coolant valve is opened and closed via the controller.

* * * * *